June 6, 1939.  W. B. BARNES  2,160,817
OVERSPEED AND FREEWHEELING DRIVE WITH AUTOMATIC LOCKOUT
Filed Jan. 25, 1934
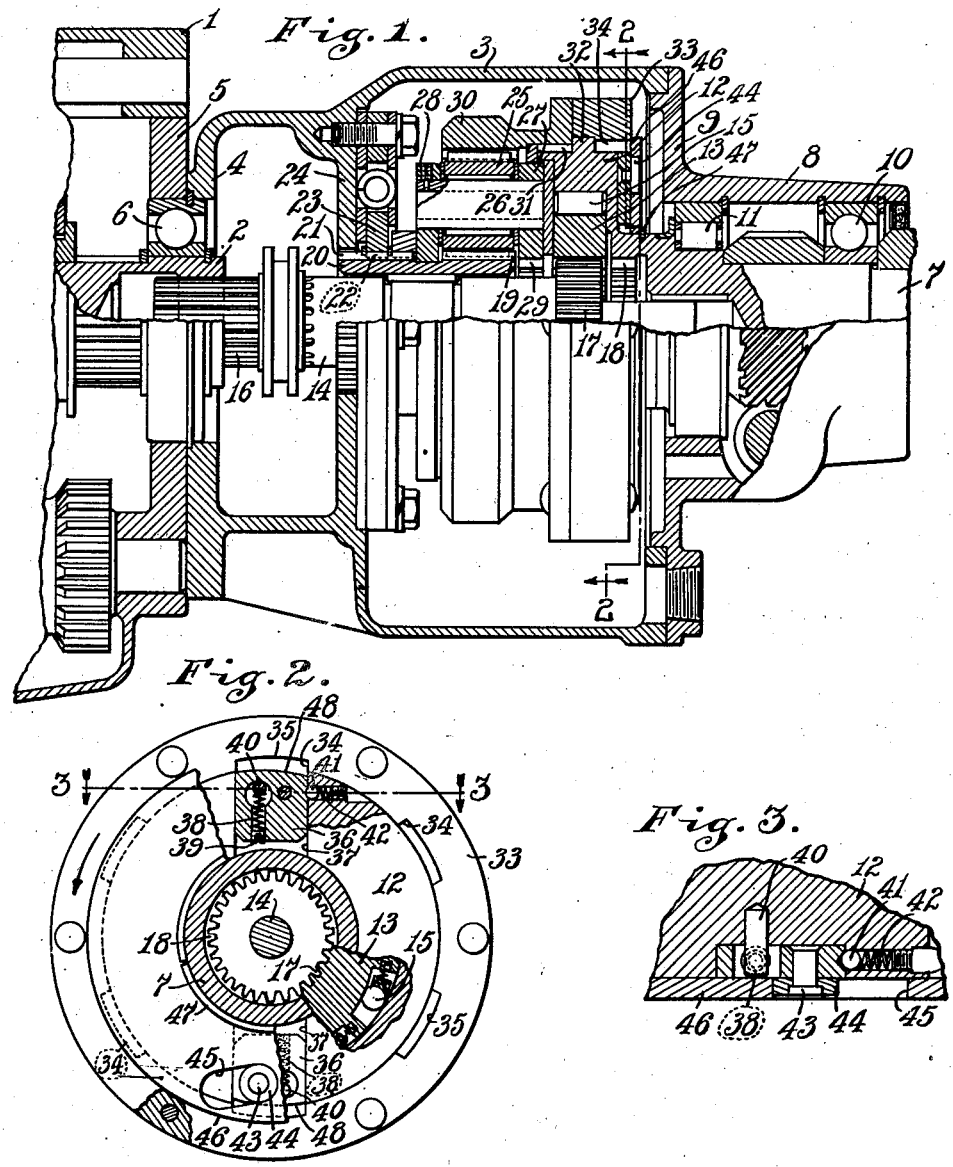
INVENTOR.
William B. Barnes,
BY
Hood + Hahn.
ATTORNEYS Patented June 6, 1939

2,160,817

UNITED STATES PATENT OFFICE 2,160,817

OVERSPEED AND FREEWHEELING DRIVE WITH AUTOMATIC LOCKOUT

William B. Barnes, Indianapolis, Ind., assignor to Barnes Motor Developments Company, Muncie, Ind., a partnership composed of said William B. Barnes and Freda Arthur Barnes Application January 25, 1934, Serial No. 708,176

34 Claims. (Cl. 74—260)

My invention relates to improvements in transmissions and particularly to a transmission wherein the propeller shaft of the car is adapted to be operated at a higher speed than that of the engine shaft.

It is one of the objects of my invention to provide means whereby the overspeed transmission will be automatically connected when the speed of the propeller shaft reaches a predetermined point. Other objects and advantages of my invention will appear more fully in the accompanying specification and claims.

For the purpose of disclosing my invention I have illustrated an embodiment thereof in the accompanying drawing in which Fig. 1 is a longitudinal section of a transmission gearing embodying my invention;

Fig. 2 is a section on the line 2—2 of Fig. 1,
Fig. 3 is a section on the line 3—3 of Fig. 2.

In the embodiment of the invention illustrated the overspeed gearing is of the planetary type gearing and is adapted to supplement the standard transmission gearing of the three speeds forward and one reverse type of the type now more or less standard in the automobile industry.

In the structure illustrated the standard transmission housing 1 is shown, and journaled in this housing is a shaft 2 adapted to be driven through the instrumentality of the usual change speed gearing, portions of which are illustrated.

Arranged to be mounted at the rear of the housing 1 is the casing 3 which is adapted to enclose the planetary overspeed gearing. The front wall 4 of this casing is secured to the rear wall 5 of the transmission casing, and it will be noted that the roller bearing 6 for the rear end of the shaft 2 is mounted in both of the walls 4 and 5.

The propeller shaft 7 is mounted in an extension 8 of the rear wall 9 of the casing 3, being provided with suitable ball bearings 10 and roller bearings 11. This propeller shaft 7 projects in the casing 3 and has formed thereon an overhanging extension chamber constituting the outer member 12 of an overrunning clutch, the inner member 13 of which is connected to an intermediate shaft 14. Suitable clutch rollers 15 are interposed between the cammed surfaces of the inner member 13 and the outer member 12 of the overrunning clutch whereby when the outer member is rotated at a greater speed than the inner member the two members will become disengaged.

The intermediate shaft 14 is provided with splines 16 adapted to mesh with internal teeth formed on the shaft 2 so that the shaft 14 and the shaft 2 will rotate in unison while the shaft 14 may have an axial movement relative to the shaft 2. This shaft 14 is also provided at its opposite end with a set of teeth 17 adapted to mesh with teeth on the inner member 13 of the overrunning clutch. These teeth are also adapted to be moved into meshing engagement with internal teeth 18 on the shaft 7 and, when this engagement is effected, a direct drive will be established between the shaft 2 and the shaft 7 through the intermediate shaft 14. However, with the teeth 17 disengaged from the teeth 18 a direct drive also will be established from the shaft 2 to the shaft 7 through the shaft 14 and the overrunning clutch heretofore described.

The planetary type of overspeed gearing is mounted within the casing 3. The sun gear 19 of this gearing is formed on a hollow sleeve 20 surrounding the shaft 14 and this sleeve at its rear end is provided with teeth 21 adapted to engage teeth 22 on a holding member 23 secured against rotation to a wall 24 of the casing 3. The means for holding this sun gear against rotation comprises a vibration absorbing locking mechanism more fully described in my copending application Serial No. 645,030, filed November 30, 1932.

This sun gear 19 is adapted to mesh with the pinions 25 carried on pinion shafts 26 in turn supported in the pinion carrier comprising a pair of ring members 27 and 28 in which the shafts are mounted and which surround the shaft 14. One of these ring members 27 is provided with internal teeth 29 adapted to be engaged by the teeth 17 whereby the pinion carrier will be rotated by and with the shaft 14.

The pinions 25 are adapted to in turn mesh with a ring gear 30 in turn surrounding the pinions and floatingly carried on the outer member 12 of the overrunning clutch, suitable needle bearings 31 being interposed between the ring gear and the clutch member to reduce friction to the minimum. In order to maintain the ring gear against axial displacement the clutch member 12 is provided with an annular flange 32 adapted to abut against the end of the ring gear and operate in an annular recess of a clamping ring 33 bolted against the face of the ring gear. In effect the clamping ring constitutes a part of the ring gear.

It will be noted that normally the ring gear is disconnected from the driven shaft 7 although it is floatingly carried on an extension of this shaft. For the purpose of connecting the ring gear with the shaft 7 under predetermined conditions I provide an automatic clutch, and to this end the ring 33 is provided with a series of notches 34 in its inner periphery, the bottoms of which are cam shaped as at 35, as more fully appears in Fig. 2. A plurality, preferably two, of radially moving dogs 36 are mounted in slots 37 in the rear face of the member 12. These dogs are biased in their retracted position through the instrumentality of coiled springs 38 arranged in bores in the dogs and interposed between adjustable plugs 39 in the dogs and relatively stationary pins 40 mounted in the face of the member 12. In addition to the springs for biasing the dogs in their retracted position I provide poppets 41 engaging in notches on a side edge of each of the dogs biased in engaging position through the instrumentality of springs 42, and in order to insure a synchronous movement, particularly into engaging position, of the dogs, each dog is provided with a pin 43 provided with a roller 44 operating in a cammed slot 45 formed in a disk 46 secured over the face of the dogs and held in position by means of a suitable split ring 47 mounted in a groove formed in the shaft 7. This ring is free to rotate and the angles of the slots 45 are such that the outward movement of the dogs will tend to rotate the disk. However, by this disk the two dogs are tied together so that they operate in unison.

The tension of the springs may be adjusted to permit the dogs to move radially outwardly under the influence of centrifugal force at any desired speed. When this speed has been reached, due to centrifugal force, the dogs will be moved radially outward into engaging relation with a pair of the series of notches 34. It will be noted that the dogs have cammed tops as 48 and due to this arrangement if the member 33 is rotating in the direction of the arrow at a greater speed than that of the member 12 the cammed top 48 of each of the dogs will strike against the following shoulder of the slots 34 and be prevented from engaging. As soon, however, as the speed of the two members reaches substantially synchronism the dogs will engage, thus locking the ring gear 30 to the driven shaft 7. As has been heretofore explained, when the member 33 is rotating in the direction of the arrow at a considerably greater speed than that of the member 12, due to the cam faces 48 of the dogs 36, the dogs will not engage in their slots or notches. When the speed, however, of the two parts synchronizes with the dogs directly opposite their respective notches, the dogs, under the action of centrifugal force, will slip in the notches, or as soon as the speed of the member 12 becomes slightly greater than the speed of the member 33, the then leading edge of the dog will engage one of the shoulders of the notches and the dogs will engage. It is, therefore, apparent that the clutch will only engage when the members are operating in synchronism or in substantial synchronism, as the relative speed between the member 33 and the member 12 is only very slight, when the member 12 is rotating at a greater speed than the member 33 at the time of the engagement of the dogs.

The operation of the apparatus is such that when the teeth 17 are in mesh with the teeth 18, as illustrated in Fig. 4, due to the axial shifting of the shaft 14 a direct two-way drive will be established between the shaft 2 and the shaft 7, whereby the shaft 7 will be operated at the same speed as the shaft 2. If, however, the shaft 14 is shifted to the left, looking at Fig. 1, until the teeth 17 mesh with the teeth on the inner member 13 of the overrunning clutch, (and they may or may not be in mesh with the teeth 29 of the pinion carrier), a direct one-way drive through the overrunning clutch will be established between the shaft 2 and the shaft 7. With the teeth 17 in mesh with the teeth of the member 13, and likewise the teeth 29 of the pinion carrier, as illustrated in Fig. 5, the ring gear 30 will be rotated at a higher speed, through the planetary gearing, than that of the shaft 14.

But, assuming the speed of the shaft 7 to be below the critical point, the clutch connecting the ring gear with the shaft 7 will be out of engagement. When, however, the speed of the shaft 7 reaches the critical point at which centrifugal force will overcome the springs 38, the dogs 36 will move outwardly into engaging position as illustrated in Fig. 6, but it will be borne in mind that under these conditions the ring gear and its accompanying ring 33 will be moving at a greater speed than the member 12, so that while the dogs under centrifugal action are biased into engaging position, they will not actually engage, due to the particular construction of the outer edge of the dogs. Under these circumstances the driver or operator, if desirous of engaging the dogs, will by removing his foot from the accelerator controlling the engine speed, and thereby the speed of the shaft 2, permit the speed of the shaft 2 to drop until it is practically in synchronism with the speed of the shaft 7 and the dogs will engage, thereby establishing a drive from the shaft 2 to the shaft 7 through the overspeed planetary gear. If at any time during the operation of the vehicle the speed of the shaft 7 is allowed to drop below the critical speed, the springs 38 will bias the dogs into disengaging position and the drive will be established, instead of through the overspeed drive, through the overrunning clutch direct drive. Or, in other words, the apparatus will be thrown into free wheeling drive.

I have found from experience that extremely satisfactory results are obtained if, when the drive is used in connection with an automobile, the automatic clutch is adapted to engage when the speed of the vehicle reaches approximately fifty miles an hour. After having engaged I find that the disengagement does not actually take place until the speed has again dropped to approximately forty miles an hour. The above speeds are representative and it is obvious that any desired speed may be selected.

The device is particularly advantageous when used in driving automobiles, as, when conditions are favorable, it enables the driving of the vehicle at a relatively high speed with a comparatively slow engine speed and permits of a controlled automatic connection of the overspeed drive at the desired point. In operating the device I have found that when traveling at ordinary speeds or comparatively slow speed the engine speed is not so high as to cause excessive vibration, resulting in noise and excessive wear and tear on the engine. However, when the speed of the vehicle reaches a determined point, the operator may, by simply removing his foot from the accelerator for a short period and then again depressing the accelerator, automatically engage the overspeed drive so that in the high range of speeds the engine speed is considerably lower than the propeller shaft speed, eliminating excessive wear on the engine and considerable of the vibration and noise resulting from extremely high engine speeds.

I claim as my invention:

1. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator for initially connecting one of the members of the clutch with the driving shaft.

2. The combination with a driving and a driven shaft, of a planetary gearing for driving said driven shaft at a speed different from the driving shaft, an automatic clutch for connecting said shafts through said planetary gearing, comprising one member drivingly connected with the driven shaft and having dogs thereon movable into engaging position when the speed of said driven shaft reaches a predetermined point, and a second member normally driven when the clutch is disengaged at a greater speed than the dog-carrying member, the arrangement of said parts being such that when the speed of the two parts reach synchronism with the dog-carrying member driven at its critical speed, the clutch will engage, and means within the control of the operator for connecting the engaged member of the clutch with the driving shaft.

3. The combination with a driving shaft and a driven shaft, of a planetary gearing for driving said driven shaft at a different speed than the driving shaft and including a ring gear and a pinion carrier, an automatic clutch for establishing driving relation between the driving and driven shafts through said planetary gearing when the speed of the driven shaft reaches a predetermined point, one of the members of said clutch being connectable at the will of the operator with the driving shaft.

4. The combination with a driving shaft and a driven shaft, of a planetary gearing for driving said driven shaft at a different speed from that of the driving shaft and including a ring gear and a pinion carrier, an automatic clutch having one of the members connected to the driven shaft and the other member connected to the ring gear of said planetary gearing, said members being adapted to engage when the speed of the driven shaft reaches a predetermined point, and means for selectively connecting the driven shaft directly to the driving shaft or connecting the pinion carrier of the planetary gear with the driving shaft.

5. The combination with a driving shaft and a driven shaft, of an overrunning clutch having one of the members thereof connected to the driven shaft, and a planetary gearing including a ring gear and a pinion carrier, an automatic clutch the members of which are adapted to engage when the driven shaft reaches a predetermined speed having one of the members connected to the ring gear and the other member connected to the driven shaft and selective means within the control of the operator for drivingly connecting the driven shaft directly with the driving shaft, or for drivingly connecting one of the members of the overrunning clutch with the driving shaft, or for drivingly connecting the pinion carrier of the planetary gearing with the driving shaft.

6. The combination with a driving shaft and a driven shaft, of a planetary gearing for driving said driven shaft at a different speed than that of the driving shaft, a clutch for establishing driving relations between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator for selectively establishing driving connection between one of the members of said clutch and said driving shaft or directly between said driving and driven shafts.

7. The combination with a driving shaft and a driven shaft, of a planetary gearing for driving said driven shaft at a higher speed than that of the driving shaft and including a ring gear and a pinion carrier, and an automatic clutch for establishing driving relation between said driving shaft and the driven shaft through said planetary gearing and operable to establish said relation when the speed of the driven shaft reaches a predetermined point.

8. The combination with a driving shaft and a driven shaft, of a planetary gearing for driving said driven shaft at a speed different from that of the driving shaft, and a clutch for connecting one of said shafts with one of the members of the planetary gearing, one of the members of said clutch being connected to one of the gears of said gearing, another member of said clutch being arranged to be drivingly connected to one of said shafts, the members of said clutch being so constructed that engagement will not be effected until the two members thereof approach substantial synchronism.

9. The combination with a driving shaft and a driven shaft, of a planetary gearing for driving said driven shaft at a speed different from that of the driving shaft, of a positive clutch for establishing driving relation between said shafts through said gearing, the members of said clutch being so constructed that engagement will not be effected until the two members thereof approach substantial synchronism, one of the members of said clutch being connected with the driven shaft and the other of the members of said clutch being adapted to be connected with the driving shaft and initially driven at a speed greater than that of the driven shaft clutch member and in order to effect engagement the speed of the driving shaft will have to be reduced.

10. The combination with a driving shaft and a driven shaft, of a planetary gearing for driving said driven shaft at a different speed than that of the driving shaft, a clutch for establishing driving relation between the said shafts through said gearing, means for preventing said members of said clutch from moving into engaging relation until the speed of one of said clutch members has reached a predetermined point, said clutch being so constructed that engagement will not be effected until the two members thereof approach substantial synchronism, and means within the control of the operator for selectively establishing driving connection between one of the members of said clutch and the driving shaft or directly between the driving and driven shafts.

11. The combination with a driving shaft and a driven shaft, of a planetary gearing for driving said driven shaft at a different speed than said driving shaft, and including a relatively stationary sun gear, planet pinions, a pinion carrier adapted for connection with the driving shaft, and a ring gear, and a centrifugally operated clutch arranged when the driven shaft reaches a predetermined speed to connect said ring gear with the driven shaft.

12. The combination with a driving and a driven shaft, of a planetary gearing for driving said driven shaft at a different speed than said driving shaft, and including a relatively stationary sun gear, planet pinions, a pinion carrier adapted for connection with the driving shaft and ring gear and a centrifugally operated clutch having the centrifugally operated member drivingly connected with the driven shaft and the other member drivingly connected with the ring gear.

13. The combination with a driving and a driven shaft, of a planetary gearing for driving said driven shaft at a different speed than said driving shaft, including a relatively stationary sun gear, planetary pinions, a pinion carrier adapted for connection with the driving shaft and a ring gear, a centrifugally operated clutch arranged when the driven shaft reaches a predetermined speed to automatically connect said ring gear with the driven shaft, and means automatically operating to establish direct drive between the driving and driven shafts upon disengagement of the centrifugal clutch.

14. The combination with a driving and a driven shaft, of a planetary gear for driving said driven shaft at a different speed from that of the driving shaft, including a relatively stationary sun gear, planet pinions, a pinion carrier adapted for connection with the driving shaft and a ring gear rotatively supported on the driven shaft and having clutch members, and a second clutch member mounted on the driven shaft, having centrifugally operated engaging dogs for engagement with the ring gear clutch members.

15. The combination with a driving and a driven shaft, of a planetary gearing for driving said driven shaft at a different speed than the driving shaft, and including a relatively stationary sun gear, planetary pinions, a pinion carrier adapted for connection with the driving shaft, and a ring gear, a head connected to the driven shaft and having said ring gear rotatably mounted on its outer periphery and an over-running clutch member formed on its inner periphery and a centrifugally operated clutch arranged when the driven shaft reaches a predetermined speed to automatically connect said ring gear with the driven shaft.

16. The combination, with a casing, of a driving shaft extending into said casing, a driven shaft extending into said casing in axial alignment with said driving shaft, a head on said driven shaft, a ring gear rotatively mounted on said head, one member of an over-running clutch formed on the inner periphery of said head, a radially movable spring-retracted dog on said head constituting one member of a centrifugally operated clutch and portions on said ring gear adapted for engagement by said dog and constituting another member of said clutch, another member of said over-running clutch nesting in said head and drivingly connected to said driving shaft to establish over-running clutch relation between said driving and driven shaft, a sun gear surrounding said axis of said driven shaft and rotatively stationarily connected to said casing, pinion gears interposed between said sun gear and said ring gear, a pinion carrier, means for connecting said pinion carrier to said driving shaft to establish a drive when said centrifugal clutch is engaged between said driving and driven shafts through said gearing, said over-running clutch establishing a one-way direct drive between said shafts when the centrifugal clutch is disengaged.

17. The combination, with a casing, of a driving shaft extending into said casing, a driven shaft extending into said casing in axial alignment with said driving shaft, a head on said driven shaft, a ring gear rotatively mounted on said head, a radially movable spring-retracted dog on said head constituting one member of a centrifugally operated clutch, portions on said ring gear adapted for engagement by said dog on said head and constituting another member of said clutch, a sun gear surrounding the axis of said driven shaft and rotatively stationarily connected to said casing, pinion gears interposed between said sun gear and said ring gear, a pinion carrier, and means for connecting said pinion carrier to said driving shaft to establish a drive, when said centrifugal clutch is engaged, between said driving and driven shafts through said gearing.

18. The combination, with a casing, of a driving shaft extending into said casing, a driven shaft extending into said casing in axial alignment with said driving shaft, a head on said driven shaft, a ring gear rotatively mounted on said head, a radially movable spring-retracted dog mounted on said head constituting one member of a centrifugally operated clutch, portions on said ring gear adapted for engagement with said dog and constituting another member of said clutch, a sun gear surrounding said driven shaft and rotatively stationarily connected to said casing, pinion gears interposed between said sun gear and said ring gear, a pinion carrier, means for connecting said pinion carrier to said driving shaft to establish a drive, when said centrifugal clutch is engaged, between said driving and driven shafts through said gearing, and means automatically operating to establish a direct drive between said shafts upon disengagement of said centrifugal clutch.

19. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the members thereof has reached a predetermined point, said clutch being so constructed that engagement will not be effected until the two members thereof approach substantially synchronism, and shiftable means within the control of the operator connecting one of the members of the clutch with the driving shaft and shiftable to directly connect said driving and driven shafts.

20. The combination with a driving shaft and a driven shaft, of a planetary gearing for driving said driven shaft at a speed different from that of the driving shaft, an automatic clutch for connecting said shafts through said planetary gearing, comprising one member adapted to be drivingly connected with the driving shaft and a second member having dogs thereon movable into engaging position when the speed of the driven shaft reaches a predetermined point, said second member being normally driven when the clutch is disengaged at a lower speed than that at which the first member is adapted to be driven, the arrangement of the parts being such that when the speed of the two parts reach substantial synchronism with the dog-carrying member driven at its critical speed, the clutch will engage, and shiftable means within the control of the operator for directly connecting said driving and driven shafts and rendering said automatic clutch inoperative.

21. In a vehicle drive, power driving means, means driven by said power driving means and adapted to drive the vehicle, planetary gearing means intermediate said driving and driven means for driving said driven means at a speed different from that of said driving means and including a normally stationary fixed sun gear, a ring gear and a planet pinion in driving engagement with said sun and ring gears, and a clutch automatically connecting said driving means and driven means through said intermediate planetary gearing driving means, and manually controlled means for selectively rendering said clutch in either operative or inoperative condition.

22. In a power transmission for a motor vehicle, power driving means including a driving shaft, means including a shaft driven from said driving means and adapted to drive the vehicle, said driving and driven shafts being co-axially arranged for relative rotation, an internal gear adapted to rotate with said driven shaft, a relatively fixed sun gear, a planetary pinion engaging said internal gear and said sun gear, clutching structures adapted when declutched to be driven by said ring gear and by said driven means respectively, said clutching structures being adapted when clutched to provide a drive from said driving means to said driven means, and an overrunning clutch including driving and driven portions thereof respectively drivingly associated with said driving means and said driven means whereby to transmit a one-way drive therebetween, said driven means overrunning said driving means when said driven means is driven from said driving means through said clutching structures, one of said clutching structures including a centrifugal force actuated element adapted for positive clutching engagement with the other of said structures.

23. In a driving mechanism for a motor vehicle, power driving means, means driven by said power driving means and adapted to drive the vehicle, an overrunning clutch between said driving and driven means adapted to transmit a direct drive from said driving means to said driven means and to permit said driven means to overrun said driving means, supplemental driving means adapted for drivingly connecting said driving means and said driven means for driving said driven means from said driving means at a speed greater than that provided by said overrunning clutch, clutch means including clutching structures drivingly associated with said supplemental driving means for controlling the drive through said supplemental driving means, and manually controlled clutch means driven by one of the first two means aforesaid and adapted for selective positioning to drivingly connect one of said clutching structures to one of the first two means aforesaid for selectively rendering said clutch means and said overrunning clutch ineffective, said supplemental driving means including planetary gearing.

24. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means, an automatically actuated clutch including clutching members adapted respectively to be driven from said driving means and from said driven means, a plurality of means adapted respectively to drive said clutching members from said driving and driven means, one of said plurality of driving means including gearing for driving one of said clutching members at a speed different from that of the other of said clutching members when said driven means is driven from said driving means through said overrunning clutch, and manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement, said gearing including a planetary gear and a carrier therefor drivingly connected to one of said clutching members.

25. In a driving mechanism for a motor vehicle, power driving means, means driven by said driving means and adapted to transmit the drive therefrom to actuate the vehicle, an overrunning clutch including driving and driven members respectively drivingly connected to said driving means and to said driven means and adapted to transmit a direct one-way drive therebetween, an automatically actuated clutch including clutching members adapted respectively to be driven from said driving means and from said driven means, a plurality of means adapted respectively to drive said clutching members from said driving and driven means and for driving said driven means from and faster than said driving means when said automatically actuated clutch is engaged, one of said plurality of driving means including planetary gearing for driving one of said clutching members at a speed different from that of the other of said clutching members when said driven means is driven from said driving means through said overrunning clutch, and manually operated means including a movable clutching device drivingly connected to one of the first two means aforesaid and adapted for movement to establish a driving connection between said driving and driven means whereby to render said overrunning clutch ineffective, said clutching device providing a driving connection between one of the first two means aforesaid and one of said plurality of driving means when said clutching device is in at least one of its positions of movement.

26. The combination with a driving shaft and a driven shaft, of an overdrive planetary gearing for driving said driven shaft at a greater speed than that of the driving shaft, an overrunning clutch interposed between said driving and driven shafts for establishing a one-way one to one drive between said shafts and an automatic clutch for connecting one of the gears of said gearing to said driven shaft to establish driving relation between said driving and driven shafts through said gearing, said clutch being so constructed that engagement will not be effected until the two members approach substantial synchronism.

27. The combination with a driving shaft and a driven shaft, of an overdrive planetary gearing for driving said driven shaft at a greater speed than that of the driving shaft, including a sun gear, planet gears and a ring gear, means for holding said sun gear against rotation to effect said overdrive, an overrunning clutch interposed between said shafts for establishing a one-way one to one drive between said shafts and an automatic clutch for connecting one of the gears of said gearing to said driven shaft to establish driving relation between the driving and driven shafts through said gearing, said automatic clutch being so constructed that engagement will not be effected between the members thereof until the two members thereof approach substantial synchronism.

28. The combination with a driving shaft and a driven shaft, of a planetary gearing for driving said driven shaft at a different speed than that of the driving shaft, a clutch for establishing driving relation between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator for drivingly connecting one of the members of the clutch with one of said shafts through said gearing.

29. The combination with a driving shaft and a driven shaft, of a planetary gearing for driving said driven shaft at a different speed than the driving shaft and including a ring gear and a pinion carrier, an automatic clutch for establishing driving relation between the driving and driven shafts through said planetary gearing when the speed of the driven shaft reaches a predetermined point, one of the members of said clutch being drivingly connectable at the will of the operator with one of said shafts through said gearing.

30. The combination with a driving shaft and a driven shaft, of a planetary gearing for driving said driven shaft at a different speed than that of the driving shaft, a clutch for establishing driving relations between said shafts through said gearing, means for preventing the engagement of the members of said clutch until the speed of one of the clutch members has reached a predetermined point, said clutch being so constructed that engagement will not be effected until the two members thereof approach substantially synchronism, and means within the control of the operator for selectively establishing driving connection through said gearing between one of the members of said clutch and one of said shafts or directly between said driving and driven shafts.

31. The combination with a driving shaft and a driven shaft, of a planetary gearing for driving said driven shaft at a different speed than that of the driving shaft, a clutch for establishing driving relation between the said shafts through said gearing, means for preventing said members of said clutch from moving into engaging relation until the speed of one of said clutch members has reached a predetermined point, said clutch being so constructed that engagement will not be effected until the two members thereof approach substantial synchronism, and means within the control of the operator for selectively establishing driving connection through said gearing between one of the members of said clutch and one of said shafts or directly between the driving and driven shafts.

32. The combination with a driving shaft and a driven shaft, of a gearing for establishing a drive from the driving shaft to the driven shaft at a different speed than that of the driving shaft, a clutch arranged to automatically establish a two-way drive between said driving and driven shafts through said gearing when the driven shaft reaches a predetermined speed, a one-way clutch for establishing a one to one drive between said driving and driven shafts, a two-way clutch for establishing a one to one drive between said driving and driven shafts independently of said one-way clutch and means within the control of the operator for selectively engaging said two-way clutch or engaging said one-way clutch and drivingly connecting one of the members of the automatic clutch with one of said shafts through said clutch.

33. The combination with a driving shaft and a driven shaft, of a gearing for driving said driven shaft at a different rate of speed than the driving shaft, a one-way clutch for driving said driven shaft from the driving shaft, an automatic clutch for establishing a two-way drive between said shafts through said gearing when the speed of the driven shaft reaches a predetermined point, and means within the control of the operator for establishing a two-way drive between said shafts independently of said one-way clutch or of said gearing or drivingly connecting one of the members of the one-way clutch and one of the members of the automatic clutch through said gearing to one of said shafts, whereby while the speed of the driven shaft remains below a predetermined point a one-way drive will be established between said shafts, and when the speed of the driven shaft reaches a predetermined point a two-way drive will be established between said shafts through the instrumentality of said automatic clutch and said gearing.

34. In a power transmission for motor vehicles, power driving means including a driving shaft, means including a shaft driven from said driving means an adapted to drive the vehicle, said driving and driven shafts being coaxially arranged for relative rotation, planetary gearing adapted to drive the driven shaft from said driving shaft at a speed greater than that of the driving shaft, said planetary gearing including a fixed sun gear, an internal gear and a planet gear intermediate said sun and internal gears, means drivingly connected to said driving and driven shafts and including rotatable clutching structures adapted when clutched to drivingly connect said shafts through said planetary gearing, means for releasably driving said driven shaft from said driving shaft at the same speed therewith prior to engagement of said clutching structures, one of said clutching structures being driven from one of said shafts at the same speed therewith and the other of said clutching structures being driven through the planetary gearing at a relatively different speed prior to clutch engagement, one of said clutching structures including a centrifugal force actuated element adapted to clutch with the other of said clutching structures in response to release of said releasable driving means at or above a predetermined speed of vehicle drive and when the rotative speeds of said clutching structures are substantially synchronized.

WM. B. BARNES.

CERTIFICATE OF CORRECTION.

Patent No. 2,160,817. June 6, 1939.

WILLIAM B. BARNES.

It is hereby certified that error appears in the printed specification of the above numbered patent requiring correction as follows: Page 6, second column, line 42, claim 34, for the word "an" read and; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.